UNITED STATES PATENT OFFICE 2,506,840

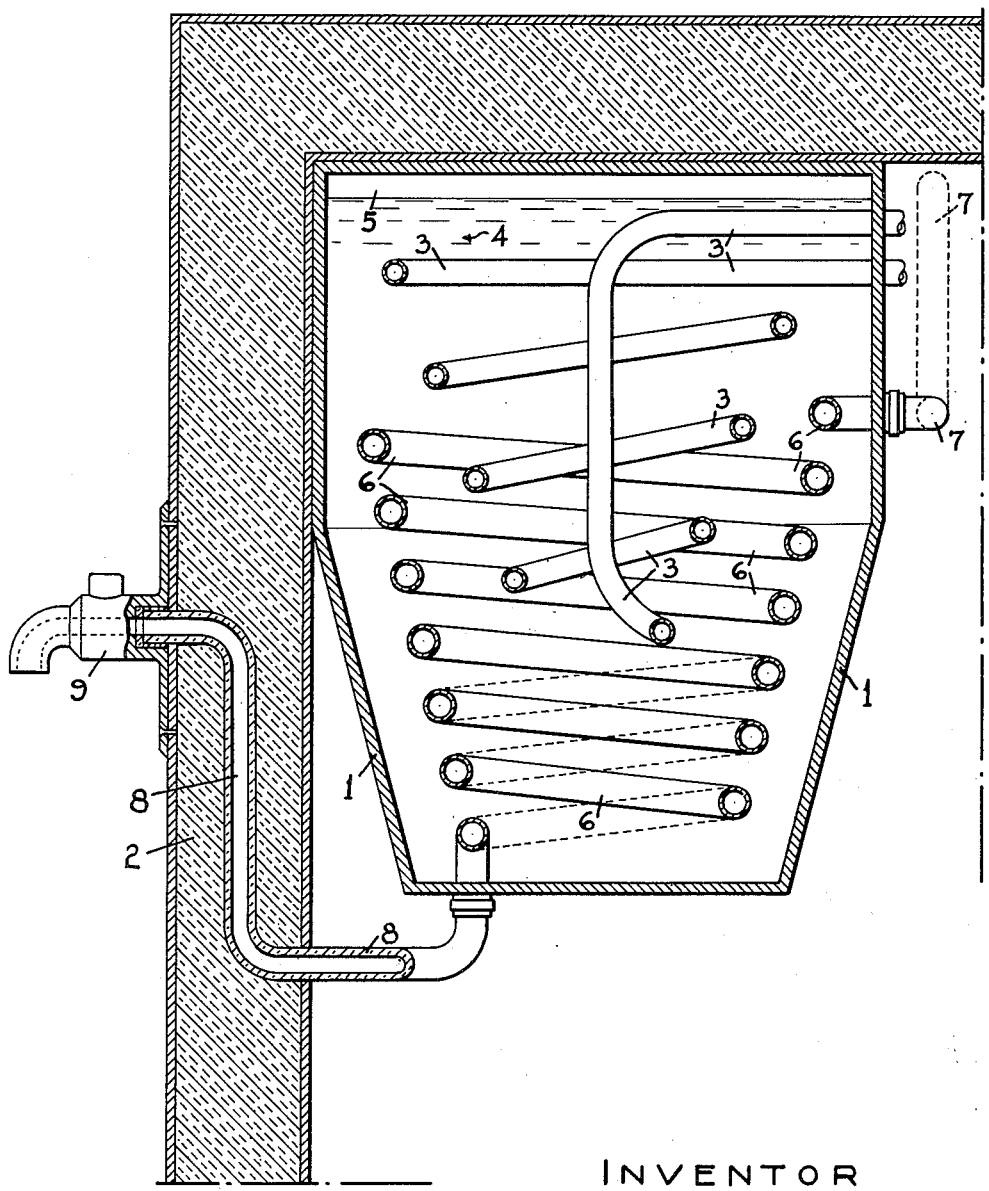

WATER COOLER WITH THERMAL INSULATED WATER COCK

Baudilio Jesús Piqué, Ampliacion de Almendares, Marianao Township, Habana, Cuba

Application June 21, 1946, Serial No. 678,420
In Cuba October 26, 1945

3 Claims. (Cl. 62—141)

My invention relates to a water cooler with thermal-insulated water cock. More particularly, my invention may be embodied in a water cooling device of small volume with a great cooling capacity, where the refrigerant medium insulates thermically in low temperature the cooled water from the refrigerant evaporator, and a system of liquid conduits insulate thermically the water-cooler from an exterior spigot and a supply of drinking water.

It is a well known fact that all refrigerators made up to the present, have not been endowed of water-cooler with water-cock at the exterior because the heat transmitted through the installations produces a loss of refrigeration in addition to the condensation of the atmospheric water vapor upon the water-cock.

One of the objects of my invention is to provide an adaptation for water-coolers in refrigerators with exterior spigot, in which the above-mentioned disadvantages will be avoided.

Other objects of my invention are: first, to provide means to produce a rapid cooling effect in a flow of water utilizing the caloric capacity of a frozen liquid at its fusion point; second, to afford means to absorb the heat transmitted by the flow of water which tends to melt the frozen liquid; third, to provide means to produce a flow of water within a frozen liquid; fourth, to afford means to insulate from low temperature a flow of water within a frozen liquid thus preventing water congealing into the solid form; fifth, to provide means to connect a water cooling coil to an exterior spigot and a supply of drinking water, respectively, avoiding heat transmission from the exterior to the interior, neither by heat conduction nor by heat convection through the water conduits.

Other objects and advantages will be understood from the following description:

It is known from physics that liquids are poor heat conductors, that is, that heat conductivity in liquids is so small that it may be considered as nil; the propagation of heat in liquids takes place rapidly only by the physical condition known as convection; when liquid receives heat from lower layers, these portions are heated and expanded, and thus become specifically lighter than upper portions, consequently they rise, while less heated and consequently heavier portions descend to the bottom, so there is a motion of warm liquid ascending and cooled liquid descending, conveying heat from the bottom to the top. On the contrary, when a liquid receives heat from its upper layers the convection phenomenon cannot take place from top to bottom, and there will not be transmission of heat by convection through the liquid mass; this is a physical condition that I embody as one of the principles of my invention.

Since liquids are poor heat conducting mediums, they will restrict the transmission of heat by conduction through its mass. This physical condition favors another object of my invention.

It is well known that all solid bodies of poor heat conducting material will restrict the transmission of heat through its mass. This is a physical condition which I employ in my invention.

Based on these experiences I attain the objects of my invention by means of the shape, arrangement and combination of parts and materials hereinafter described with reference to the accompanying drawing which represents a vertical section through a water-cooler, showing the apparatus that constitutes my invention.

A closed container 1, placed within a compartment provided with heat insulating walls 2 which may be the interior of a refrigerator. Said closed container 1 having a major and minor axis and being shaped to be adapted for use in combination with the refrigerator.

A helical coil 3, adapted to convey refrigerant, is positioned in the closed container 1. This refrigerant coil 3 may be connected to the evaporator of the refrigerator as an extension of the circulating refrigerant gas that will absorb the heat within the container 1.

Another helical coil 6, adapted to convey water to be cooled, is also positioned in the closed container 1 and surrounds refrigerant coil 3.

A feed water conduit 7, being formed of a poor heat conducting material and having a major portion lying in a plane parallel to and spaced from the major axis of the closed container 1, the major portion having its ends placed at different levels with each other and its lower level end being connected to one end of the water coil 6, for feeding water to the coil 6, the higher level end of said major portion being connected to an exterior supply of drinking water that is not shown in the drawing.

A discharge conduit 8 of substantially Z shape, being formed of a poor heat conducting material, and having an intermediate portion and two end portions, the intermediate portion lying in a plane parallel to and spaced from the major axis of the closed container 1 and being embedded in one of the insulated walls 2, the two end portions being positioned at different levels and being out of alignment with each other, such lower level end portion being connected to the other end of the water coil 6, and the higher level end portion being connected to an exterior spigot 9. The Z-shaped discharge conduit 8 being arranged to cooperate with the water coil 6 to form a trap.

As the intermediate portions of said conduits 7 and 8 have their lower level end portions connected, respectively, to the water coil 6, and their higher level end portions are connected, respectively, to the exterior where the temperature is higher than the interior of the water cooler, such arrangements will avoid heat convection through the water columns in said conduits 7 and 8. Furthermore, transmission of heat by heat conduction cannot take place through the poor heat conducting material of said conduits 7 and 8, and equally through the water mass.

The closed container 1 is almost completely filled with a liquid 4 which has a freezing point temperature higher than the freezing point of drinking water; said liquid 4 covers both coils 3 and 6, and leaves at the top a space 5 for vapor from itself intended to permit the expansion of said liquid 4 as it solidifies when freezing.

When the liquid 4 is congealed by action of the refrigerant coil 3, said liquid 4 assumes a solid state as a block amongst the water coil 6 and refrigerant coil 3, and the thickness between the separated coils 3 and 6 must be a proper width of congealed liquid 4 to constitute an efficient insulator in low temperature between said coils 3 and 6; since the liquid mass is a poor heat conducting medium and convection of heat cannot take place through the congealed mass of said liquid 4, and being its temperature is higher than the freezing point of the medium to be cooled in the water coil 6, it will not congeal the water in the coil 6, although the refrigerant gas continues flowing in the refrigerant coil 3.

It is known that the temperature of any frozen liquid remains constant while melting, and the latent heat required to convert a pound of ice to a pound of water is 144 British thermal units. Therefore, if the fusion point of the frozen liquid 4 is 39° Fahrenheit, and the temperature of the drinking water that enters the coil 6 is 75° F., this means that 36 B. t. u. per pound of water must be extracted from the coil 6, to bring the temperature of the drinking water from 75° F. to 39° F. Hence it will require $36/144$ or $\frac{1}{4}$ pound of ice to cool 1 pound of water, or 1 pound of ice will cool 4 pounds of water. Whence, the frozen liquid 4 may cool to 39° F. about 4 times its weight in quantity of drinking water that passes through the coil 6, without the flow of the refrigerant gas through the coil 3.

As the liquid 4 may cool a quantity of water about 4 times its weight, the closed container 1 may be of little capacity to be located within a refrigerator and connecting the refrigerant coil 3 as an extension of the evaporator of said refrigerator, combining the above-described water-cooler with the refrigerator.

Making the closed container 1 metallic, and omitting the refrigerant coil 3, said container 1 must be located near the freezing chamber in the refrigerator; combining said refrigerator with a metallic container 1, a metallic coil 6, the special liquid 4, exterior spigot 9, exterior supply of drinking water, and the special conduits 7 and 8.

When the above-described water-cooler is not combined with a refrigerator, said water-cooler must be employed with a unit of refrigeration, not shown in the drawing, and the container 1 may be made of metal. The compartment among the insulating walls 2 will be cooled by heat convection through the air cooled by contact with the lower surface of said container 1, constituting a system of ice box combined with the water-cooler above-described.

What I claim as new and desire to secure by Letters Patent is:

1. A water cooling device comprising insulated walls defining a compartment, a closed container within the compartment, said container having a major and minor axis, a helical coil adapted to convey refrigerant positioned in the closed container, another helical coil adapted to convey water to be cooled also positioned in the closed container and surrounding the refrigerant coil, a feed water conduit, a discharge conduit of substantially Z shape, an exterior spigot, the last two mentioned conduits being formed of a poor heat conducting material, said feed water conduit having a major portion lying in a plane parallel to and spaced from the major axis of the closed container, the major portion having its ends placed at upper and lower levels, its lower level end being connected to one end of the water coil for feeding water to the coil, said Z-shaped discharge conduit having an intermediate portion and two end portions, the intermediate portion lying in a plane parallel to and spaced from the major axis of the closed container and being embedded in one of the insulated walls, the two end portions being positioned at upper and lower levels and being out of alignment with each other and such lower level end portion being connected to the other end of the water coil and the higher level end portion being connected to the exterior spigot, the Z-shaped discharge conduit being arranged to cooperate with the water coil to form a trap, and said closed container being almost completely filled with a liquid having a freezing point higher than the medium to be cooled.

2. A water cooling device comprising insulated walls defining a refrigerator, a closed container within the refrigerator, said container having a major and minor axis, a helical coil positioned in the closed container and adapted to convey refrigerant as an extension of the evaporator of the refrigerator, another helical coil adapted to convey water to be cooled also positioned in the closed container and surrounding the refrigerant coil, a feed water conduit, a discharge conduit of substantially Z shape, an exterior spigot, the last two mentioned conduits being formed of a poor heat conducting material, said feed water conduit having a major portion lying in a plane parallel to and spaced from the major axis of the closed container, the major portion having its ends placed at upper and lower levels, its lower level end being connected to one end of the water coil for feeding water to the coil, said Z-shaped discharge conduit having an intermediate portion and two end portions, the intermediate portion lying in a plane parallel to and spaced from the major axis of the closed container and being embedded in one of the insulated walls of the refrigerator, the two end portions being positioned at different levels and being out of alignment with each other, the lower level end portion being connected to the other end of the water coil and the higher level end portion being connected to the exterior spigot, the Z-shaped discharge conduit being arranged to cooperate with the water coil to form a trap, and said closed container being almost completely filled with a liquid having a freezing point higher than the medium to be cooled.

3. A water cooling device comprising insulated walls defining a refrigerator, a closed container within the refrigerator, said container having a major and minor axis, a helical coil adapted to convey water to be cooled positioned in the closed container, a feed water conduit, a discharge conduit of substantially Z shape, an exterior spigot, the last two mentioned conduits being formed of a poor heat conducting material, said feed water conduit having a major portion lying in a plane parallel to and spaced from the major axis of the closed container, the major portion having its ends placed at different levels, its lower level end being connected to one end of the water coil for feeding water to the coil, said Z-shaped discharge conduit having an intermediate portion and two end portions, the intermediate portion lying in a plane parallel to and spaced from the major axis of the closed container and being embedded in one of the insulated walls of the refrigerator, the two end portions being positioned at different levels and being out of alignment with each other, the lower level end portion being connected to the other end of the water coil and the higher level end portion being connected to the exterior spigot, the Z-shaped discharge conduit being arranged to cooperate with the water coil to form a trap, and said closed container being almost completely filled with a liquid having a freezing point higher than the medium to be cooled.

BAUDILIO JESÚS PIQUÉ.

REFERENCES CITED

The following references are of record in the file of this patent:

UNITED STATES PATENTS

| Number | Name | Date |
| --- | --- | --- |
| 1,934,166 | Candor | Nov. 7, 1933 |
| 2,022,787 | Smith | Dec. 3, 1935 |
| 2,108,898 | Lyons | Feb. 22, 1938 |
| 2,142,856 | Lieb et al. | Jan. 3, 1939 |